Feb. 23, 1971     R. F. CHIREAU     3,565,694

BIPOLAR ELECTRODE AND METHOD OF MAKING SAME

Filed March 17, 1969

INVENTOR.
ROLAND F. CHIREAU
BY

Karl G. Ross
Attorney

United States Patent Office 3,565,694
Patented Feb. 23, 1971

3,565,694
**BIPOLAR ELECTRODE AND METHOD
OF MAKING SAME**
Roland F. Chireau, Saint Albans, N.Y., assignor to Yardney International Corp., New York, N.Y., a corporation of New York
Filed Mar. 17, 1969, Ser. No. 807,523
Int. Cl. H01m 13/02
U.S. Cl. 136—121                                    15 Claims

ABSTRACT OF THE DISCLOSURE

A bipolar electrode for use in a battery is formed by laminating a zinc sheet onto an aluminum foil and successively depositing on the latter a pressure-sensitive adhesive layer of isobutylene polymer or copolymer and a tougher sealing layer of ethylene/vinyl-acetate copolymer, both polymeric layers being made conductive by an admixture of graphite in addition to carbon black.

---

Figure 1:
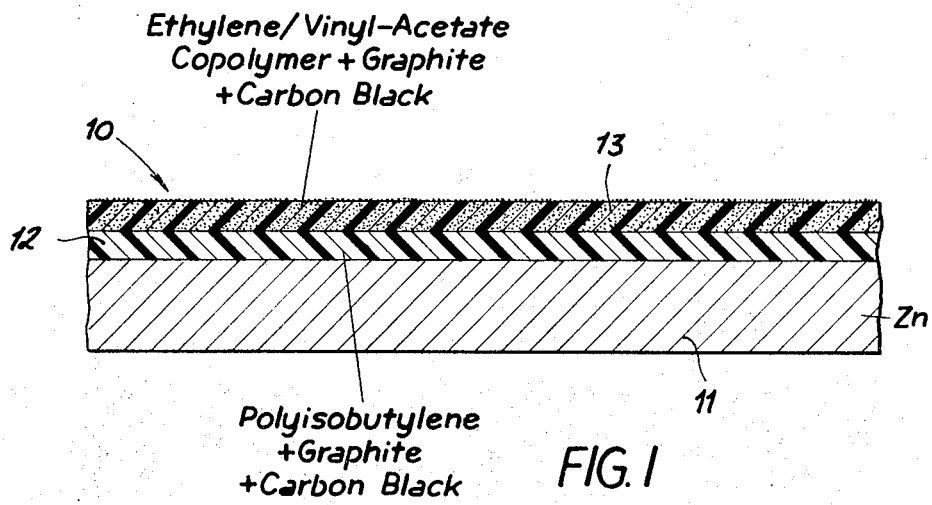

My present invention relates to a bipolar electrode for electrochemical cells or batteries, i.e. a plate-shaped structure having two different electrochemically active materials on opposite surfaces.

Electrodes of this type, wherein one of the active materials is a base metal (e.g. zinc, magnesium or aluminum) soluble in an electrolyte, have been made heretofore by coating a sheet of the base metal with an adhesive layer containing the active material of opposite polarity distributed therethrough in finely comminuted form. The polymeric matrix of this coating, apart from adhering firmly to the metal sheet, must be sufficiently conductive to form a low-resistance internal current path between the two plate surfaces.

A polymeric substance resistant to acidic electrolytes, such as chromic or sulfuric acid, is an ethylene/vinyl-acetate copolymer (referred to hereinafter as E/VA) which is thus eminently suitable as a carrier and binder for finely comminuted metallic or carbonaceous particles serving as an electropositive active material of a bipolar electrode whose electronegative material is one of the aforementioned base metals. Since, however, E/VA lacks the necessary degree of adhesiveness, it has been suggested heretofore to blend it with another resinous substance, more specifically a polymer or copolymer of isobutylene (butyl rubber); see U.S. Pat. No. 3,400,020. The resulting film, incorporating both carbon black and graphite, is applied to the supporting metal sheet under heat and pressure.

An object of my present invention is to provide an alternate method of producing a bipolar electrode of this general description without the need for applying pressure, thereby enabling such electrodes to be manufactured in a variety of sizes (or to be cut from larger sheets of indefinite dimensions) without regard to available rollers or other pressure-exerting means.

Another object of this invention is to provide an electrode plate of this character whose electropositive side consists of conductive particles (carbon or metal) imbedded in a film of substantially pure E/VA, with only a minimum exposure of the less electrolyte-resistant isobutylene-base elastomer.

I have found, in accordance with my present invention, that these objects can be realized by the successive application of two distinct polymeric coatings to a sheet of zinc or other metal, i.e. an adhesive inner coating of isobutylene polymer or copolymer and an outer coating of E/VA, both these coatings including relatively fine particles of carbon black (preferably acetylene black) and relatively coarse particles of graphite or electrolyte-insoluble metal to reduce their resistance and to serve as the electropositive active material. The outer coating is applied to the adhesive layer while the latter is still tacky, the resulting composite being then baked at an elevated temperature preferably ranging between substantially 60° and 90° C.

According to another important feature of my invention, the adhesive layer is composed of a low-molecular-weight fraction and a high-molecular-weight fraction of isobutylene polymer (or copolymer), the former providing the necessary degree of tackiness whereas the latter imparts the requisite strength to the coating. For purposes of the present disclosure, the terms "low molecular weight" and "high molecular weight" refer to molecular weights below and above 20,000, respectively; the lower molecular-weight limit for the first fraction is about 1000 whereas the upper limit for the second fraction is about 200,000. Preferred weights range between about 12,000 and 18,000 in the first fraction and between about 25,000 and 100,000 in the second fraction.

I have also found that a more tenacious bond between the metallic substrate and the sealing layer of E/VA is obtained if the adhesive layer is deposited in two stages, with application of the second coat before any appreciable hardening of the first coat. The relatively short interval (on the order of a minute or less) between the emplacement of the two coats, by spraying or otherwise, permits the development of an incipient bond of the first coat to the substrate whereby this coat is anchored to the metal and becomes sufficiently self supporting to sustain a second coat of approximately the same weight. In this two-coat process the two weight fractions of the isobutylene polymer (or copolymer) are advantageously intermixed within each coat. It is, however, also possible to apply first a relatively thin film of low-molecular-weight polymer to the substrate, to superimpose thereupon a layer of high-molecular-weight polymer and to top the latter with a further thin film of the first-mentioned polymer which then—after an interval on the order of minutes—receives the outer layer of E/VA, all without intervening hardening. The thickness of the E/VA layer may range between approximately 0.25 and 0.5 mm.

In general, the proportion of the two weight fractions of the isobutylene polymer should be on the order of 1:1, whether they be commingled in a single layer or distributed in separate layers.

Figure 2:
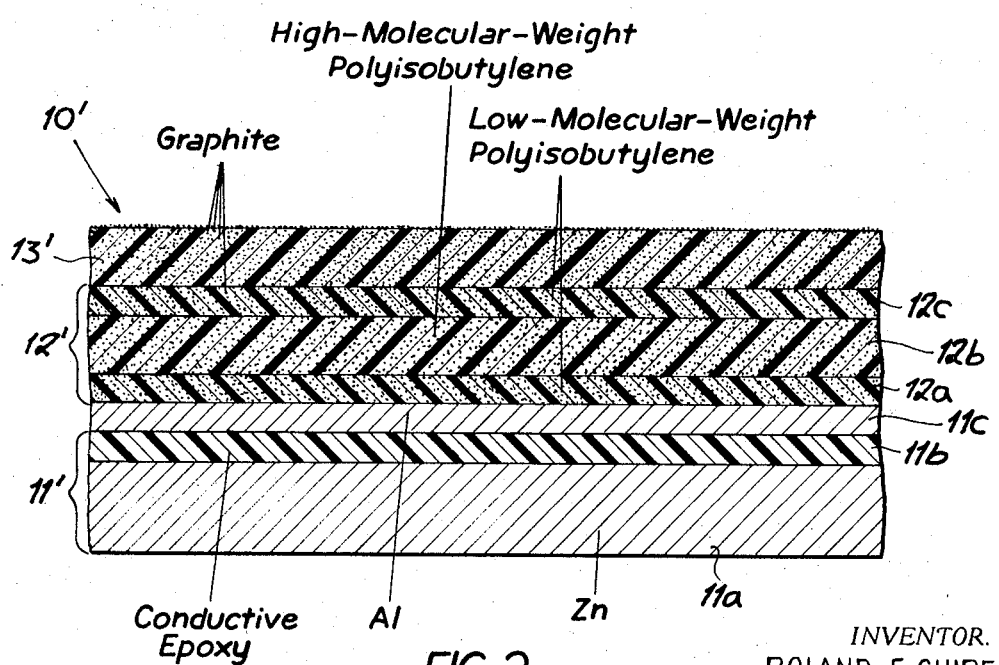

The above and other features of my invention will be described in greater detail with reference to the accompanying drawing in which:

FIG. 1 is a cross-sectional view of a bipolar electrode embodying the invention; and FIG. 2 is a fragmentary sectional view, similar to FIG. 1 but drawn to a larger scale, illustrating a modification.

In FIG. 1 I have shown an electrode plate 10 comprising a zinc sheet 11, an adhesive layer 12 and a sealing layer 13 superimposed one upon the other, layers 12 and 13 consisting each of an organic matrix with imbedded particles of an active material insoluble in an acidic electrolyte which forms an electrochemical couple with the zinc of substrate 11. The matrix of layer 12 is polyisobutylene having admixed therewith a sufficient quantity of acetylene black to give it the necessary thixotropic character, this layer acting as a pressure-sensitive adhesive for bonding the layer 13 to the sheet 11. The matrix of layer 13 consists of E/VA, again with an admixture of acetylene black. The relatively coarse conductive particles imbedded in both matrices consist, in this example, of graphite.

The bipolar electrode 10 of FIG. 1 may be prepared as follows:

(a) 25 g. of polyisobutylene with a molecular weight of 15,000 is dissolved, together with a like amount of the same polymer having a molecular weight of 50,000 in 600 cc. of 1,1,1-trichloroethane. The mixture is heated to boiling and, after the resin has gone into solution, is allowed to cool, whereupon 25 g. of acetylene black (mesh size 300) and 25 g. of graphite (mesh size 60) are stirred into the mass.

(b) 7.5 g. of E/VA is dissolved in 150 cc. of toluene heated to 80° C. Upon the cooling of the solution, 40 g. of graphite and 10 g. of acetylene black, as above, are stirred into same.

(c) The solution obtained in step (a) is sprayed or doctored onto the zinc sheet 11 whose receiving surface had previously been degreased and cleaned by conventional means. A first coat, built up to a density of approximately 0.01 g./cm.$^2$, is allowed to dry for about 30 seconds whereupon a second coat of the same material is deposited thereon while the first coat is still tacky. The combined mass of layer 12 amounts to approximately 0.02–0.03 g./cm.$^2$.

(c) After two minutes, with the second coat of layer 12 still tacky, the solution produced in step (b) is applied thereto so as to form the layer 13 whose thickness is about 0.35 mm.

(e) The composite is air-dried for 20 minutes at room temperature, with evaporation of the residual solvent, and is then baked in an oven for four hours at a temperature of 75° C.

The setting time in the baking oven could be materially reduced by forced air circulation as is well known per se.

In FIG. 2 I have shown a slightly modified electrode 10' whose substrate 11' consists of a zinc sheet 11a and an aluminum foil 11c bonded thereto by an epoxy layer 11b, the layer being made conductive by the inclusion of metallic particles as is well known per se. The adhesive layer 12' is shown divided into three strata 12a, 12b, 12c, strata 12a and 12c being films with a low-molecular-weight matrix (polyisobutylene 15,000) whereas stratum 12b has a high-molecular-weight matrix (polyisobutylene 50,000) all admixed with proportionate shares of acetylene black and graphite in accordance with step (b), above. The top layer 13' is similar to layer 13 of FIG. 1 but, in this enlarged view, is shown to have an uneven exposed surface owing to the presence of the relatively coarse carbon particles; this unevenness is advantageous in that it increases the apparent surface area of the carbon side of the electrode.

Plate 10 or 10' may be used as one of several stacked electrodes of the same type held separated by conventional spacers in a battery of the zinc/chromic-acid type. The interposition of a protective aluminum layer 11b between the zinc sheet 11a and the carbon-containing resin coating 12', 13' prevents the exposure of major areas of the adhesive layer 12' to the electrolyte upon partial erosion of the zinc layer.

I claim:

1. A method of making a bipolar electrode, comprising the steps of depositing on a sheet of active metal a first organic layer consisting essentially of an isobutylene-base synthetic elastomer in a tacky state with admixture of a finely comminuted conductive material forming an electrochemical couple with said metal, depositing on said first layer a second layer consisting essentially of ethylene/vinyl-acetate copolymer with admixture of said finely divided conductive material, and solidifying the resulting composite at an elevated temperature.

2. A method as defined in claim 1 wherein said first layer has a polymeric matrix consisting of a mixture of a low-molecular-weight polyisobutylene and a high-molecular-weight polyisobutylene.

3. A method as defined in claim 1 wherein said first layer is applied to said sheet in several successive coats without intervening hardening.

4. A method as defined in claim 1 wherein said conductive material is carbon.

5. A method as defined in claim 4 wherein the carbon is partly in the form of relatively fine acetylene black and partly in the form of relatively coarse graphite.

6. A method as defined in claim 1 wherein said elevated temperature ranges between substantially 65° and 85° C.

7. A method as defined in claim 1 wherein the organic constituents of each of said layers are dissolved in an organic solvent prior to admixture of said finely divided conductive material therewith.

8. A bipolar electrode comprising a sheet of active metal having an exposed surface; a first layer on the opposite surface of said sheet consisting essentially of a matrix of isobutylene polymer or copolymer incorporating a finely divided conductive material which forms an electrochemical couple with said metal; and a second layer on said first layer consisting essentially of ethylene/vinyl-acetate copolymer incorporating said finely divided conductive material.

9. An electrode as defined in claim 8 wherein said active metal is zinc.

10. An electrode as defined in claim 9 wherein said sheet includes a protective metal foil interposed between the zinc sheet and said first layer.

11. An electrode as defined in claim 10 wherein said metal foil consists of aluminum.

12. An electrode as defined in claim 10 wherein said foil is bonded to said zinc sheet by a film of conductive epoxy.

13. An electrode as defined in claim 8 wherein said conductive material is carbon.

14. An electrode as defined in claim 13 wherein said carbon is partly in the form of relatively fine particles of acetylene black and partly in the form of relatively coarse graphite particles.

15. An electrode as defined in claim 14 wherein said graphite particles form an uneven exposed surface on said second layer.

References Cited

UNITED STATES PATENTS

| 2,154,312 | 4/1939 | MacCallum I | 136—121 |
| 2,165,061 | 7/1939 | MacCallum II | 136—127 |
| 3,400,020 | 9/1968 | Carpine et al. | 136—127 |

FOREIGN PATENTS

| 832,463 | 4/1960 | Great Britain | 136—121 |

WINSTON A. DOUGLAS, Primary Examiner

M. J. ANDREWS, Assistant Examiner

U.S. Cl. X.R.

117—216; 136—122, 127